(12) United States Patent
Ballagh et al.

(10) Patent No.: US 7,911,481 B1
(45) Date of Patent: Mar. 22, 2011

(54) METHOD AND APPARATUS OF GRAPHICAL OBJECT SELECTION

(75) Inventors: Jonathan B. Ballagh, Boulder, CO (US); Thomas E. Fischaber, Golden, CO (US); Roger B. Milne, Boulder, CO (US); Krista M. Marks, Boulder, CO (US)

(73) Assignee: Disney Enterprises, Inc., Burbank, CA (US)

( * ) Notice: Subject to any disclaimer, the term of this patent is extended or adjusted under 35 U.S.C. 154(b) by 708 days.

(21) Appl. No.: 11/956,124

(22) Filed: Dec. 13, 2007

Related U.S. Application Data

(60) Provisional application No. 60/870,028, filed on Dec. 14, 2006.

(51) Int. Cl.
*G09G 5/00* (2006.01)
*G09G 5/02* (2006.01)

(52) U.S. Cl. ......................... 345/629; 345/592; 345/619

(58) Field of Classification Search .................. 345/629, 345/592, 619
See application file for complete search history.

(56) References Cited

U.S. PATENT DOCUMENTS

| | | | |
|---|---|---|---|
| 4,931,783 A | 6/1990 | Atkinson | |
| 5,515,496 A | 5/1996 | Kaehler | |
| 5,577,188 A * | 11/1996 | Zhu | 715/745 |
| 6,819,345 B1 | 11/2004 | Jones | |
| 7,747,077 B2 * | 6/2010 | Murakami | 382/180 |
| 2004/0104926 A1 * | 6/2004 | Murray et al. | 345/719 |
| 2006/0041564 A1 * | 2/2006 | Jain et al. | 707/100 |
| 2006/0074870 A1 | 4/2006 | Brill | |
| 2007/0101282 A1 * | 5/2007 | Goossen et al. | 715/764 |
| 2007/0230810 A1 * | 10/2007 | Kanatsu | 382/243 |
| 2008/0082907 A1 * | 4/2008 | Sorotokin et al. | 715/210 |
| 2008/0133579 A1 * | 6/2008 | Lim | 707/102 |

* cited by examiner

*Primary Examiner* — M Good Johnson
(74) *Attorney, Agent, or Firm* — Farjami & Farjami LLP

(57) ABSTRACT

Disclosed are various approaches for allowing the selection of graphical objects in a graphical user interface. In one embodiment, selection overlays are generated for each of a plurality of graphical objects. The selection overlays are sorted into layers over the layers of the graphical objects, with the sorting based in part of a characteristic of the associated graphical objects other than the layers to which those objects are assigned. The plurality of objects and the selections overlays (which may be transparent) are displayed. In response to user input (e.g., mouse click or mouse motion) relative to a screen region associated with one selection overlay, the state of the overlay and the associated graphical object are updated and displayed accordingly.

16 Claims, 11 Drawing Sheets

METHOD AND APPARATUS OF GRAPHICAL OBJECT SELECTION

RELATED PATENT DOCUMENTS

This patent document claims the benefit, under 35 U.S.C. §119(e), of U.S. Provisional Patent Application No. 60/870,028, filed Dec. 14, 2006 and entitled: "METHOD AND APPARATUS OF GRAPHICAL OBJECT SELECTION IN A WEB BROWSER," which is fully incorporated herein by reference.

TECHNICAL FIELD

This present invention relates generally to the use and production of graphical user interfaces (GUIs). More specifically, the invention relates to methods for enabling the selection of graphical objects.

BACKGROUND

Graphical user interfaces (GUIs) have become very popular in providing users of computers, particularly users of computers with a mouse or other input pointer devices, with access to computer software, including menus, software options, desktop components, images and other graphical objects. WINDOWS XP®, by Microsoft Corporation, of Redmond Wash., and MAC OS X®, by Apple Computer, of Cupertino Calif., are popular computer operating system implementations that allow users to interact and manipulate desktop software (e.g., word processing, graphic design, presentation software and web browsers) using a variety of graphical components. Those knowledgeable in the art will understand that a graphical component may be displayed visually to users as at least one image displayed on a computer monitor.

Techniques and popular conventions for managing graphical objects are well known by those skilled in the art of modern computer desktop usage. For example, in a windows-based environment such as that provided by WINDOWS XP, a desktop window object may be resized by clicking near the window border using a user input pointer, controlled by, for example, a mouse, and dragging the user input pointer to a different screen location in order to specify new window dimensions.

Techniques and conventions for interacting and manipulating graphical objects are well known and consistent across most applications. Users often select graphical objects for manipulation, for example, by moving a user input pointer into the region of the object and clicking the input pointer to initiate the selection and manipulation process.

More than one graphical object may be displayed in an application at a given instance. These graphical objects may be positioned on the display such that one or more graphical objects partially or fully overlap another graphical object. In these instances, it is of particular interest how the software discriminates, and the granularity at which the discrimination is made, between two or more overlapping graphical objects during the process of graphical object selection.

Two-dimensional computer-aided design and graphic arts programs ("graphics applications"), such as VISIO® and MICROSOFT OFFICE (Word, Power Point), by Microsoft Corporation, of Redmond, Wash., and ADOBE ILLUSTRATOR, by Adobe Systems Incorporated, of San Jose, Calif., generally allow users to organize their designs and artwork into layers, more or less analogous to sheets of acetate bound together. Each object on a layer has a stacking order such that objects can be on top of one another. Similarly, layers are also stacked on top of one another to form the final work. The final work is rendered as a two dimensional design to be viewed on a video display, printed, etc. To the extent that one or more graphical objects are layered over other graphical objects, some graphical objects may be partially or fully occluded in the rendered two-dimensional design. Programs conventionally provide a mechanism to reorder object layering (e.g. via menu controls to "bring to front", "send to back", etc.). Some programs also provide a "layers palette"—a taxonomical tree of the layer identifiers—allowing the user to select the layer on which to draw, reorder the layers by dragging and dropping them with the mouse, and move art from one layer to another.

In the prior art, selection of graphical objects is handled according to visibility on the screen, i.e., a particular graphical object can be selected with the mouse only when the mouse pointer is over a visible pixel of that graphical object. The visibility of pixels of the graphical object is decided according to the layering of graphical objects into a stacking order. Objects that are low in the stacking order can be largely or entirely occluded by objects (often larger objects) higher in the stacking order.

Although techniques for object selection are well known to those skilled in the art, these methods of object selection may be difficult and frustrating when a user attempts to select one of several objects that are in a state of object overlap or occlusion. To select objects in certain circumstances, users must first re-order the layering of objects before selecting the desired object and then re-order the objects again after completing the desired transformation, in the methods of the prior art. Such extraneous steps put an undesirable burden on the user. Such controls and steps may also be non-intuitive and difficult to learn for inexperienced users.

There may also be considerable discovery involved with finding and learning how these controls function in a foreign or new environment, which may cause significant frustration for new users.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1A:
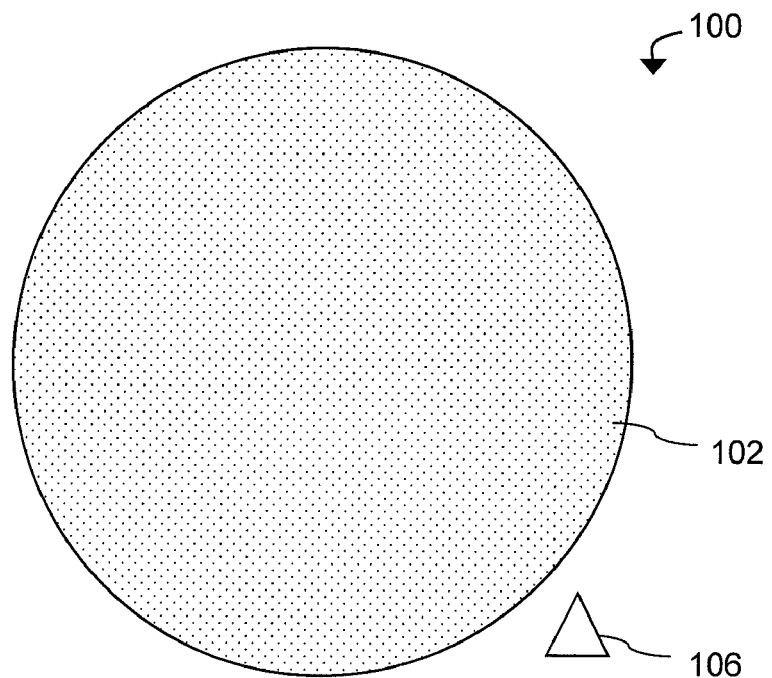
FIG. 1a shows two graphical objects inside a screen region.

The embodiments of the present invention are now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing embodiments of the invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

It will be recognized by those with ordinary skill in the art that the inventive GUI methods described in this invention may be programmed in a software language such as C++, JAVA™, JavaScript™, ActionScript™, Visual Basic™ or other languages. The graphical objects within the GUIs may be selected and manipulated by a user of the software using an input device, such as a mouse, touch sensitive pad, or other mechanism.

The embodiments of the present invention allow easy discrimination and selection of graphical objects when a plurality of graphical objects is present in an application. The embodiments of the invention allow inexperienced users with little or no computer knowledge to perform graphical object selection, while also maintaining a level of usability and flexibility preferred by those already skilled in the art of modern computer use. The embodiments provide a selection mechanism capable of discriminating between different graphical objects when one or more graphical objects partially or fully occludes one or more other graphical objects.

The term "graphical object" is used broadly herein to include any graphical object that may be displayed to users on an output display screen using at least one graphical image, including but not limited to, desktop windows, raster images, desktop publishing images, clip art, icons, and user toolbars to name a few. Such use of this term should be easily understood by those with normal skill in the art.

Figure 1B:
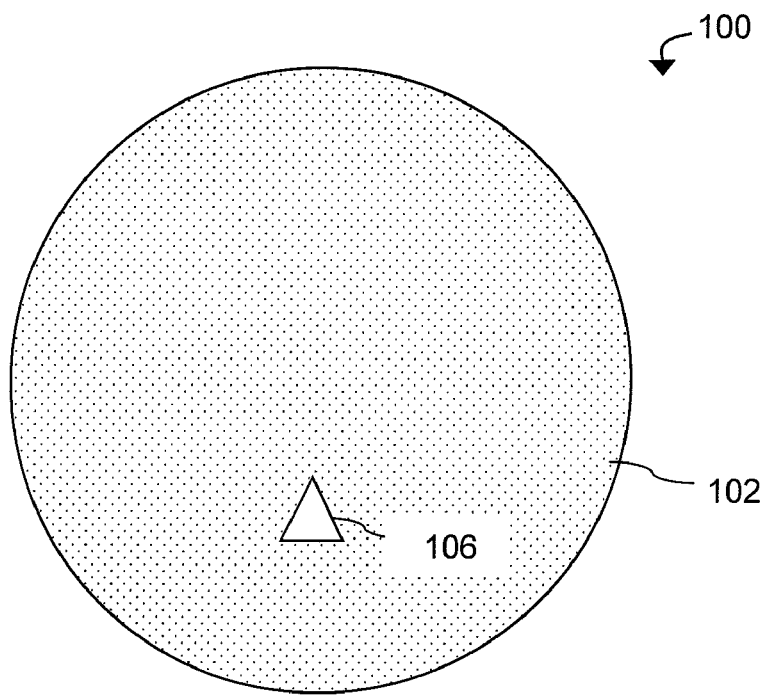
FIG. 1b shows two graphical objects, with the smaller graphical object residing within the perimeter of the larger graphical object, with the larger graphical object in a lower stacking layer than the smaller graphical object.
Figure 1C:
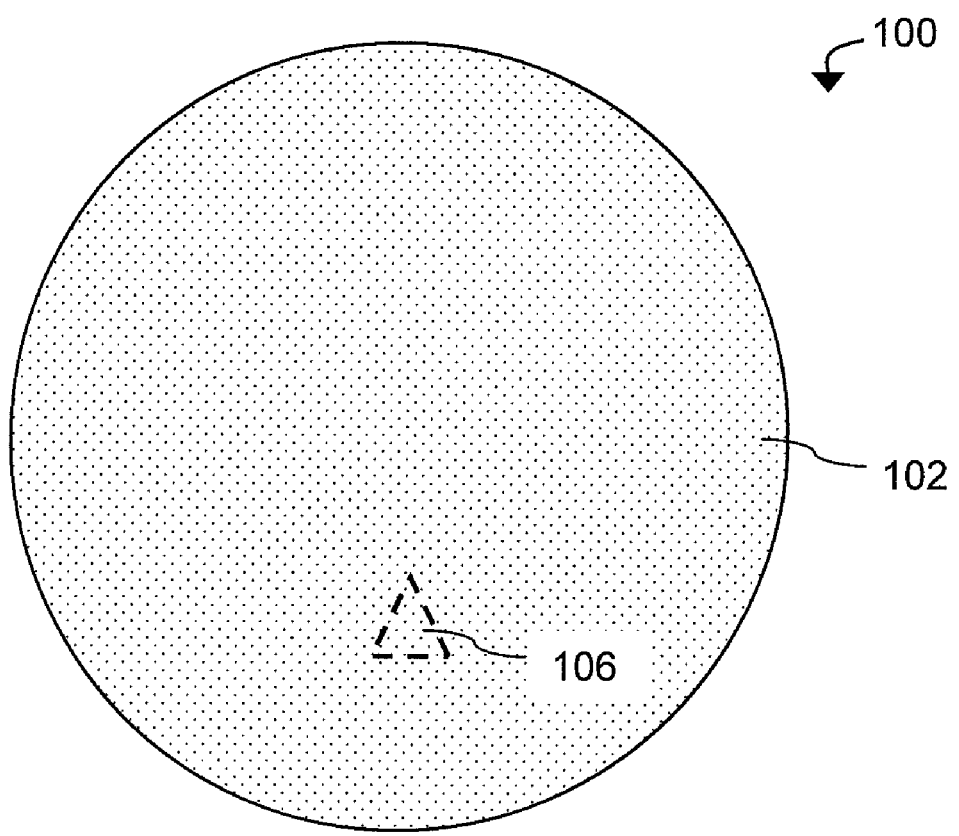
FIG. 1c shows two graphical objects, with the smaller graphical object residing within the perimeter of the larger graphical object, with the larger graphical object in a higher stacking layer than the smaller graphical object, highlighting the importance of being able to discriminate correctly between the two objects during the graphical object selection process.

FIGS. 1a-1c depict two graphical objects, circular graphical object 102 and triangular graphical object 106 as they may be displayed in screen area 100 in the graphical user interface of an application. The various FIGS. 1a-1c illustrate the screen area under various relative positioning of the graphical objects. In FIG. 1a, graphical object 102 and graphical object 106 do not overlap or intersect. In FIGS. 1b and 1c, graphical object 102 and graphical object 106 overlap completely. In FIG. 1b, graphical object 106 is layered above graphical object 102 and in FIG. 1c, graphical object 106 is layered behind graphical object 102. In the representation of graphical object 102 and graphical object 106 in the graphical user interface of an application, and as arranged in FIG. 1c, graphical object 106 would typically not be visible. This condition has been illustrated in FIG. 1c through the representation of graphical object 106 by dashed lines on the boundaries of graphical object 106.

To better illustrate a method by which graphical objects may be depicted on a display in such conditions as were described in FIGS. 1a-1c, FIGS. 2a-2c are provided. In FIGS. 2a-2d, the layering of graphical objects into a plurality of discrete layers is illustrated through parallel layers: layer 202, layer 204, layer 206, and layer 208. These layers may correspond to an arbitrary number of layers into which graphical objects are placed in an embodiment of the invention, and then drawn back to front, (e.g., layer 202 to layer 208), as will be understood by those skilled in the art. In other embodiments of the invention, a property "z" may be associated with each graphical object and the objects may be drawn onto the screen (at associated x and y coordinates) in the order of increasing "z," as will be understood by those skilled in the art. A mechanism that orders graphical objects according to a property such as "z" will be understood by those skilled in the art to be equivalent in functionality to a mechanism that orders graphical objects according to their assignment to layers such as is illustrated in FIGS. 2a-2d The layering and positioning of graphical object 102 and graphical object 106 in FIG. 2a in layer 202 and layer 204 correspond to the screen placement and layering shown in FIG. 1a. Likewise, the layering and positioning of graphical object 102 and graphical object 106 in FIG. 2b in layer 202 and layer 204 correspond to the screen placement and layering shown in FIG. 1b. Likewise, the layering and positioning of graphical object 102 and graphical object 106 in FIG. 2c in layer 202 and layer 204 correspond to the screen placement and layering shown in FIG. 1c.

Figure 2A:
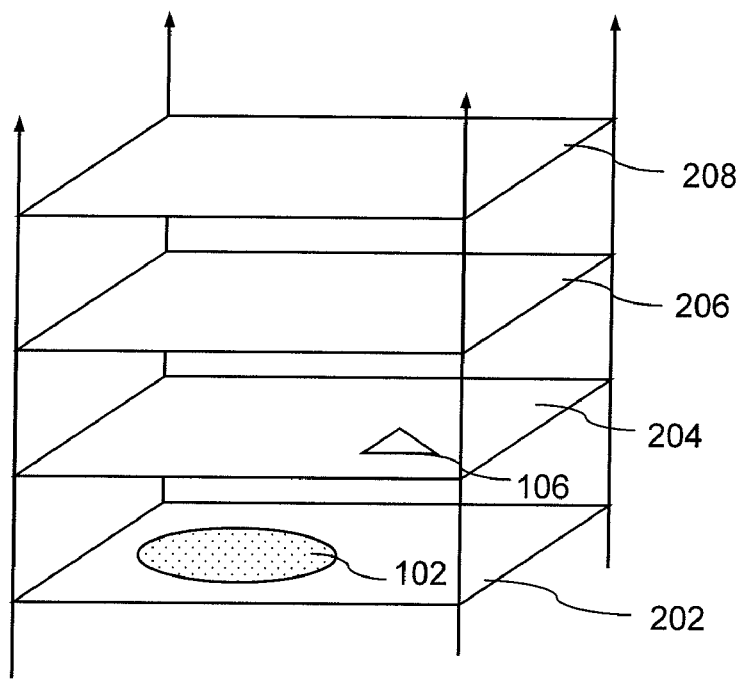
FIG. 2a shows the graphical objects of FIG. 1a in a layered view.
Figure 2B:
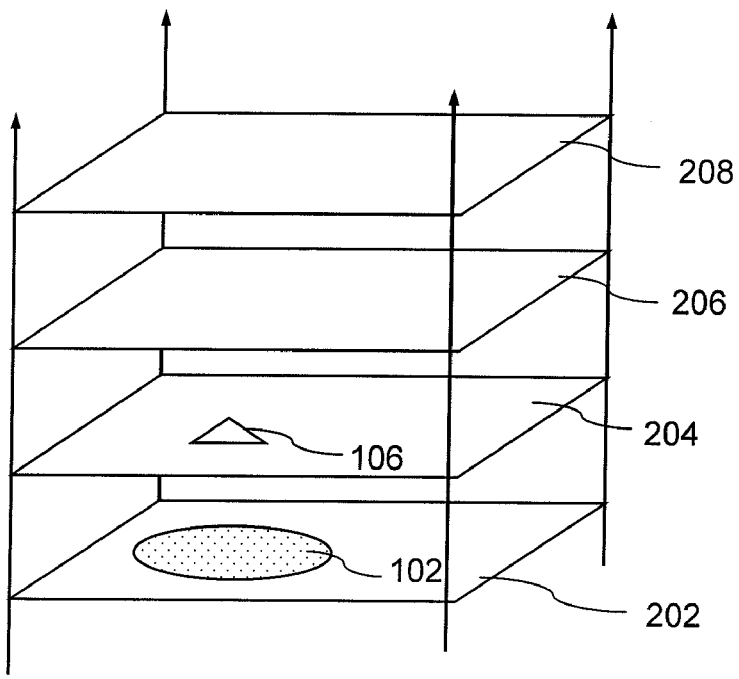
FIG. 2b shows the graphical objects of FIG. 1b in a layered view.
Figure 2C:
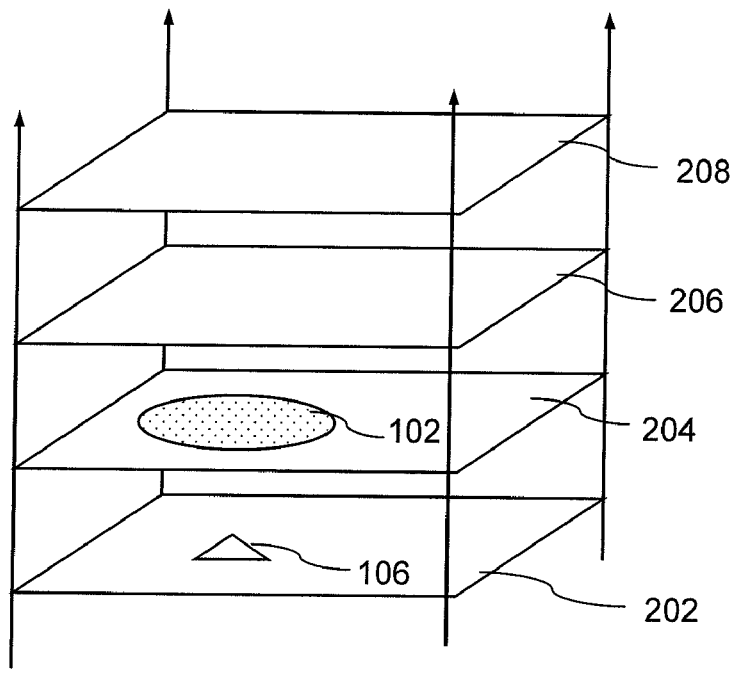
FIG. 2c shows the graphical objects of FIG. 1c in a layered view.
Figure 2D:
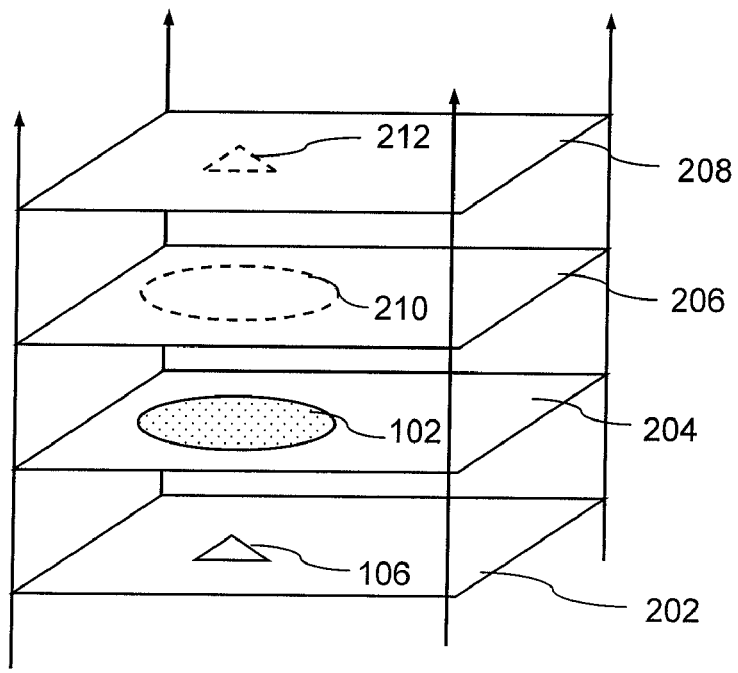
FIG. 2d shows the graphical objects of FIG. 1c in a layered view, along with selection overlays illustrating an operating concept of an embodiment of the invention.

In an embodiment of the invention, object-identical overlays may be created for graphical objects such that they cover identical screen locations to the graphical object from which they are derived and may be placed in a stacking layer above the associated graphical object. FIG. 2d illustrates such an overlay 210 for graphical object 102 and an overlay 212 for graphical object 106. Overlay 210 and overlay 212 may or may not be realized as visible graphical objects displayed to screen 100. In one embodiment of the invention, overlay 210 may be identical to graphical object 102 except that it is made to be fully transparent (e.g., to have all pixel values given an alpha-channel value of 1.0) and therefore be selectable but not visible, as will be understood by those skilled in the art.

In an embodiment of the invention, overlays may be used to enhance the user's ability to select graphical objects via a graphical user interface in an application. For example, using the overlays shown in FIG. 2d, an application may detect which graphical object (including the overlays) is highest in the stacking order and also occupies a screen pixel corresponding to the screen pixel currently associated with the pointer (as will be further illustrated by FIGS. 3 and 4). Such detection of a particular graphical object given a pointer position will be understood by those skilled in the art. Given such detection, selection of a graphical object may be made (e.g., upon mouse entry into a region or upon mouse click) according to the ordering of overlays, and thus allow for the selection of a graphical object such as graphical object 106 that may be occluded by other graphical objects, as is the case in the state illustrated in FIGS. 1c and 2c.

In an embodiment of the invention, all overlays may be placed in layers above the highest layer occupied by any (non-overlay) graphical object, as is illustrated in FIG. 2d. In various embodiments of the invention, the ordering of the overlays into layers may be determined by sorting of the set of graphical objects into an ordered list, with the ordering based on various properties of the graphical objects. The sort order may be the function of various properties of the graphical objects to which the overlays are associated, the various properties including: the stacking layers to which the associated graphical object is assigned (their "z" property), the number of pixels the associated graphical object would occupy on the screen ignoring possible occlusion by other graphical objects in higher layers, the number of pixels the associated graphical object would occupy on the screen accounting for possible occlusion by other graphical objects in higher layers, the area of a rectangular bounding box that contains all screen pixels of the associated graphical object, a priority or "importance" value for the associated graphical object, and the elapsed time since the associated graphical object was last selected. Those skilled in the art will understand that these properties may be used alone or in combination in determining the sort order.

In one embodiment of the invention, the sort order may be a function only of the area of said bounding boxes, such that overlays associated to smaller bounding boxes are sorted higher in the said list. Such an embodiment may be useful in a setting in which it is desirable to allow small graphical objects, occupying smaller area are placed towards the end of the list (that is, at the top of the stacking order). Such ordering by descending size will generally make objects selectable even when occluded (e.g., a small object occluded by a larger object). Furthermore, the ordering can be computed quickly in conditions where graphical objects are being frequently repositioned, and such an embodiment may therefore be useful in such a setting, especially when processing resources are limited.

Those skilled in the art will understand that these properties may be used alone or in combination in determining the sort order. For example, in an embodiment of the invention, the sort order may be a function of a linear combination of the following: (1) the number of pixels (P) the associated graphical object (o) would occupy on the screen ignoring possible occlusion by other graphical objects in higher layers; and (2) an exponentially decaying function of the elapsed time (T) since the associated graphical object was last selected, e.g., $e^{-(K*T)}$, where K is a constant. Specifically, the sort order may be based on the following function:

$$f(o)=C1*P(o)+C2*e^{-(K*T(o))}$$

where C1, C2 and K are constants and P and T depend on the associated graphical object, o, for which the function is being computed.

In another embodiment of the invention, the sort order may instead be a function of the number of pixels the associated graphical object would occupy on the screen ignoring possible occlusion by other graphical objects in higher layers, and the number of pixels the associated graphical object would occupy on the screen accounting for possible occlusion by other graphical objects in higher layers, such that selection overlays are placed into higher layers according to the percentage of the graphical object that is occluded by other objects. Such an embodiment will require more computation than that of the previously described embodiment, but provide a more consistent mechanism for the selection of occluded objects.

In yet other embodiments of the invention, the sort order may be a function of a priority value of the associated graphical objects. Such an embodiment may be useful in a setting in which it is desirable to be able to select a certain class of graphical objects, regardless of their state of occlusion.

In one embodiment of the invention, the ordered list for the overlays is created by sorting graphical objects based on the respective areas of their bounding boxes. Graphical objects occupying the largest amount of screen area will thus be placed towards the front of the list (that is, at the bottom of the stacking order) while graphical objects occupying smaller area are placed towards the end of the list (that is, at the top of the stacking order). Such ordering by descending size will generally make objects selectable even when occluded (e.g., a small object occluded by a larger object). In a second embodiment, said list may be sorted based explicitly on the occlusion of graphical objects. In a third embodiment, said list may be sorted based explicitly on the occlusion of the computed polygonal (or other) selection approximations for the graphical objects. The result of any of the three foregoing sort orderings may produce such an ordering as is illustrated in FIG. 2d, in which the ordering of overlay 210 and overlay 212 is reversed from the ordering of respective graphical object 102 and graphical object 210.

In other embodiments of the invention, overlays for graphical objects may be created such that the overlays do not occupy a set of pixels identical to those of the associated graphical object, but a set of pixels derived from the set of pixels occupied by the associated graphical object. It may be advantageous, for example to enlarge certain overlays relative to the graphical objects with which they are associated (e.g., to enlarge overlay 212 relative to graphical object 106).

In one embodiment of the invention, polygon approximations may be used as overlays and may be derived from corresponding graphical object, being computed as functions of variables including, but not limited to, error tolerances, limits on polygon complexity (e.g., number of edges, etc.) in addition to the set of pixels occupied by the corresponding graphical object. Those knowledgeable in the art will appreciate that polygon approximations may be obtained for a graphical object using algorithms that have been extensively researched by computer scientists. Moreover, the coordinates associated with approximation need only be calculated once, and normalized coordinates may be stored as attributes on the graphical objects.

In another embodiment of the invention, the selection overlay for a graphical object may be determined by a thresholding of image pixel transparency followed by zero or more interleaved application of image erosion or image dilation. Such thresholding, erosion, and dilation algorithms will be well known to those skilled in the art. Erosion and dilation may be used to extend or constrict selection overlays and/or to eliminate or merge small selection islands, isthmuses, or peninsulas. Such polygonal approximations and these and other methods for the computation of selection overlays are further discussed below along with the descriptions of FIGS. 6a-6f and FIG. 7.

Figure 3:
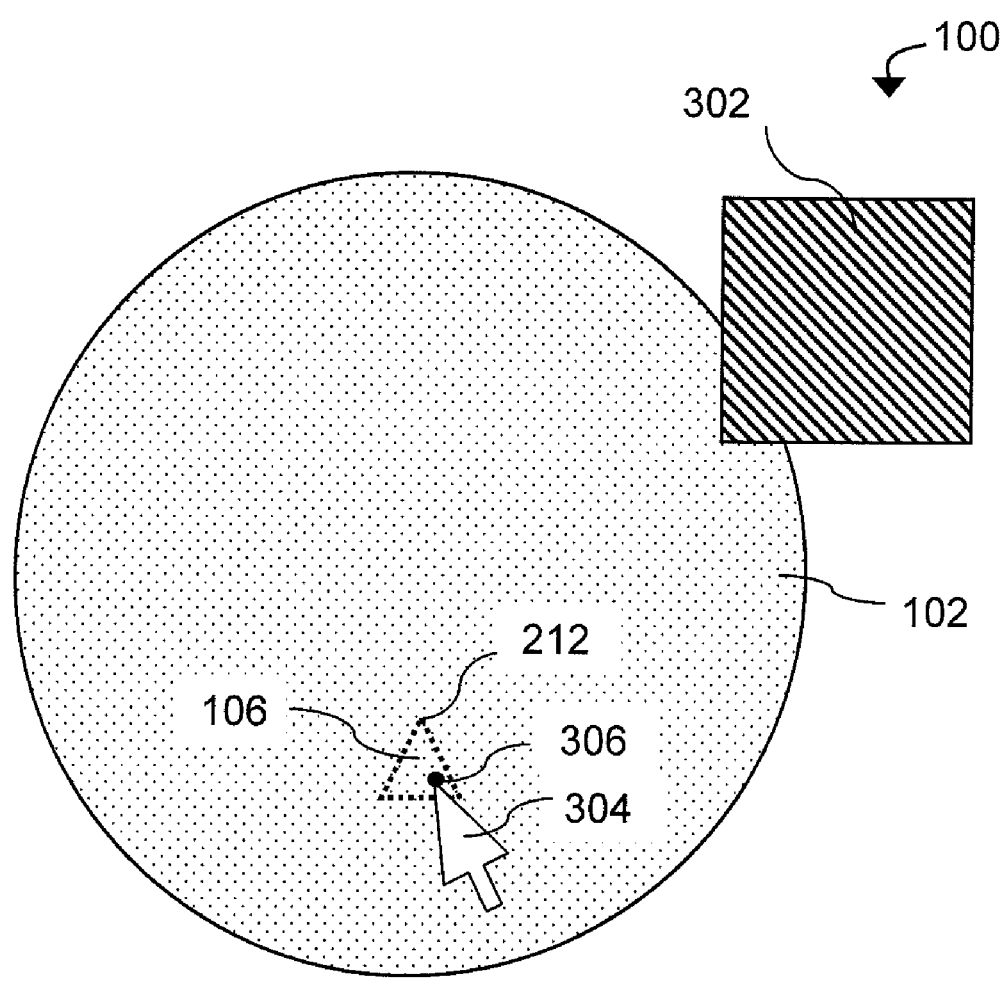
FIG. 3 is a view of a graphical user interface including graphical objects and a selection overlay as might be displayed by an embodiment of the invention.

In FIG. 3, graphical object 102 and graphical object 106 are shown in the same position as in FIG. 1c, but with the addition of graphical object 302 and the (mouse) pointer represented by graphical object 304. The pointer selection point 306 (corresponding to a screen pixel) of pointer 304 is also illustrated. Square graphical object 302 is in a stacking order above graphical object 102. Graphical object 102 and graphical object 106 are both "underneath" pointer 304 in the sense that they cover the screen pixel corresponding to pointer selection point 306, as will be understood by those skilled in the art. In one embodiment of the invention, overlay 212 may be a graphical object that is made visible on the screen, e.g., by outlining it with a dashed border, so as to indicate to the user that a mouse click at the current pointer location will result in the selection of associated graphical object 106 and not graphical object 102 that lies above graphical object 106.

Figure 4:
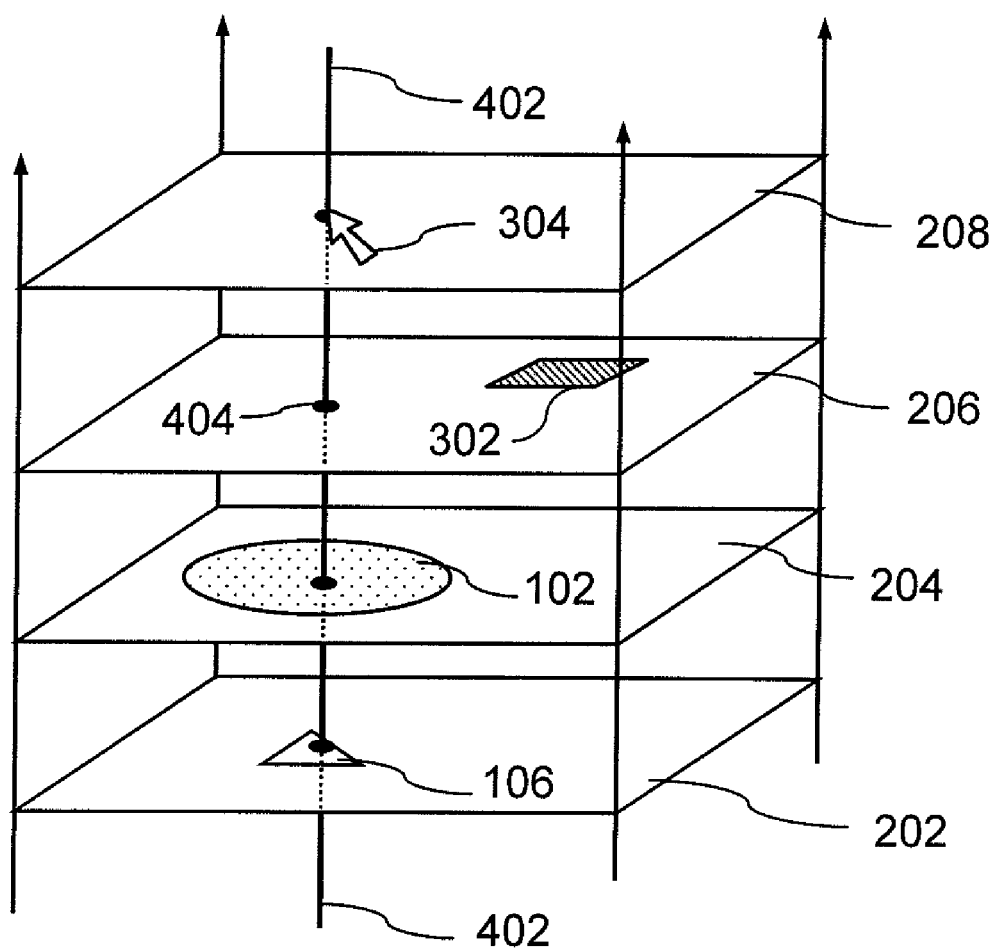
FIG. 4 is a layered view of the graphical objects of FIG. 3, excluding the selection overlay, that illustrates an aspect of an embodiment of the invention that does not use selection overlays.

In other embodiments of the invention, graphical overlays need not be used and instead, additional properties may be associated with each graphical object to embody new selection mechanisms of the invention. FIG. 4 illustrates graphical objects 102, 106 and 302 in the same positions and stacking order shown in FIG. 3, occupying stacking layers 202, 204, and 206, respectively. The pointer 304 is also illustrated as a graphical object occupying stacking layer 208. The projection of selection point 306 onto each stacking layer is also illustrated, e.g., as point 404 in layer 206. The projections of selection point 306 are collinear, lying on selection line 402, which is perpendicular to the plane of each layer (202, 204, 206, and 208). In an embodiment of the invention, a property "z_sel" may be associated with each graphical object and z_sel may be computed as a function of various properties of the graphical objects such as: the stacking layers to which the associated graphical object is assigned (their "z" property), the number of pixels the associated graphical object would occupy on the screen ignoring possible occlusion by other graphical objects in higher layers, the number of pixels the associated graphical object would occupy on the screen accounting for possible occlusion by other graphical objects in higher layers, the area of a rectangular bounding box that contains all screen pixels of the associated graphical object, a priority or "importance" value for the associated graphical object, and the elapsed time since the associated graphical object was last selected.

Figure 5:
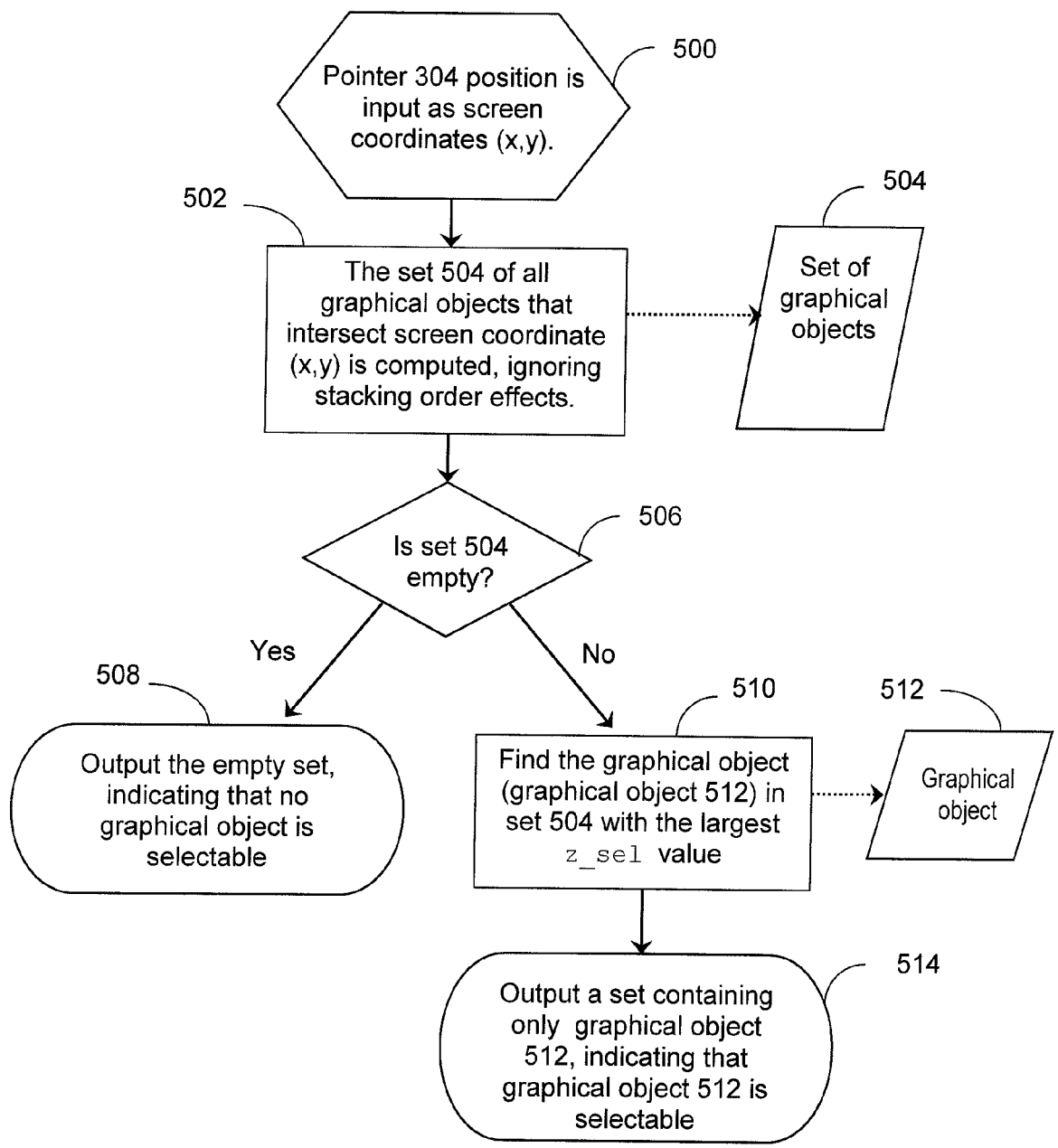
FIG. 5 is a flow chart illustrating an operating concept of an embodiment of the invention that does not use selection overlays.

For any given position of pointer 304, a single selectable graphical object (or the fact that no object is selectable) may then be computed as follows and as illustrated in FIG. 5. First, in step 500, the position of pointer 304 is input as the screen coordinates, x and y, of selection point 306 (thereby determining selection line 402). In step 502, the set 504 of all graphical objects that intersect selection line 402 (and, hence selection point 306 in the projection onto screen 100) is computed. In the example shown in FIG. 4, this set would consist of graphical object 102 and graphical object 106, but graphical object 302 would be excluded from the set. The set computed in step 502 may be empty and is tested for such in step 506. If it is empty, step 508 is reached and it is decided that no object is selectable given the position of pointer 304 and the empty set is output. Otherwise, step 510 is reached and the objects in set 504 are examined to determine the graphical object 512 with the largest z_sel value. (In the event of a tie, various tie-breaking mechanisms may be used, including arbitrary methods, such as order in memory.) In step 514, graphical object 512 is output as the single selectable graphical object.

Returning then to an embodiment of the invention in which polygon approximations may be computed and derived from the graphical objects and used as overlays for the corresponding graphical object corresponding graphical object, FIGS. 6a-f illustrates various polygon approximations to various graphical objects.

Figure 6A:
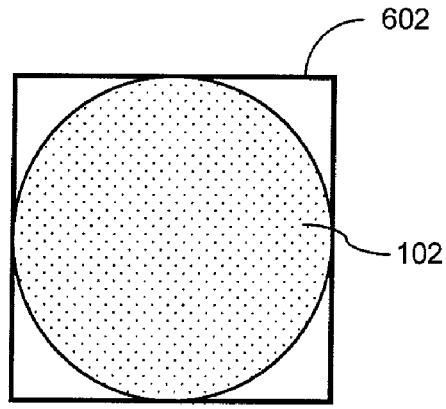
FIG. 6a is a view of a graphical object image bounded by a four-sided polygon approximation applied as the image selection region.
Figure 6B:
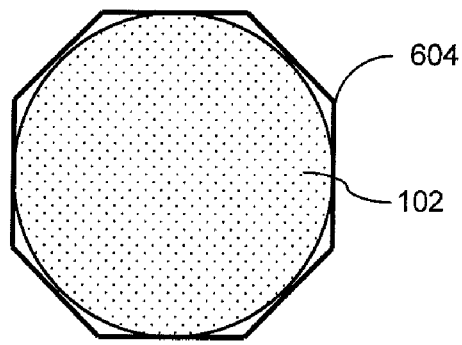
FIG. 6b is a view of a graphical object image bounded by an eight-sided polygon approximation applied as the image selection region.
Figure 6C:
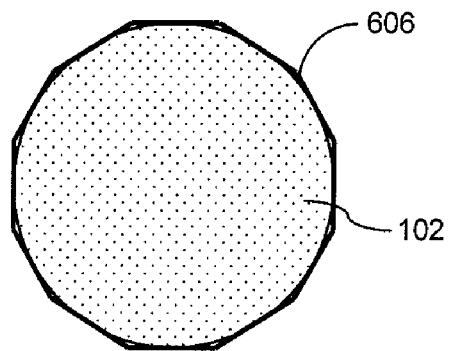
FIG. 6c is a view of a graphical object image bounded by a twelve-sided polygon approximation applied as the image selection region.

FIGS. 6a-6c show the same graphical object 102 with three different polygon approximations of the graphical object perimeter. In FIG. 6a, the polygon approximation for graphical object 102 is rectangle 602, and of the three approximations shown, FIG. 6a shows the arrangement that results in the greatest error between approximation 602 and graphical object 102. In FIG. 6b, polygon approximation 604 for graphical object 102 has eight sides, and the error between approximation 604 and graphical 102 is considerably less than the error in FIG. 6a. Polygon approximation 606 for graphical object 102 is shown with twelve sides, and has the least amount of error of the three configurations.

Figure 6D:
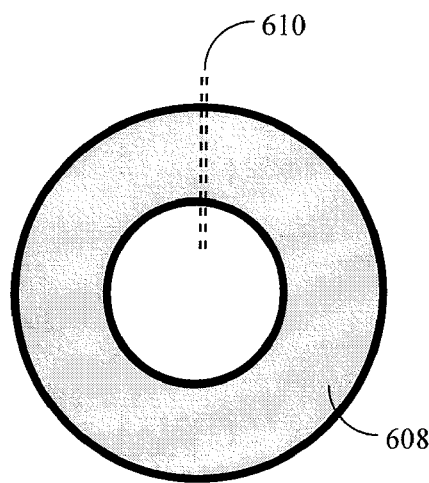
FIG. 6d is a view of a graphical object whose visible region is not simply connected.
Figure 6E:
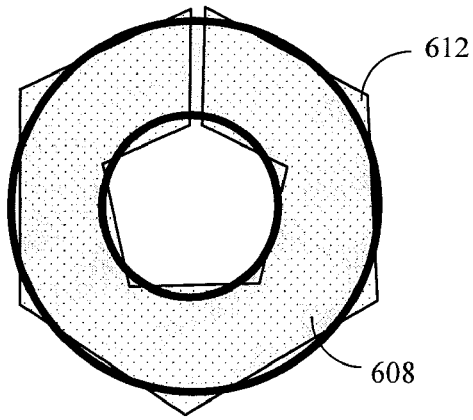
FIG. 6e is a view of a graphical object whose visible region is not simply connected, with approximation by a single polygonal region which is simply connected.

FIG. 6d shows a graphical object 608 whose non-transparent regions (indicated by gray shading) form a torus. Those skilled in the art will understand that the non-transparent regions of graphical object 608 illustrate a basic example of what in planar geometry are known as non-simply connected regions. FIG. 6e shows a polygonal approximation to the said non-simply connected region by a single polygon 612. Those skilled in the art will understand that polygon 612 can be constructed by determining a cut line 610 and using said cut line to transform region 608 into a simply connected region.

Figure 6F:
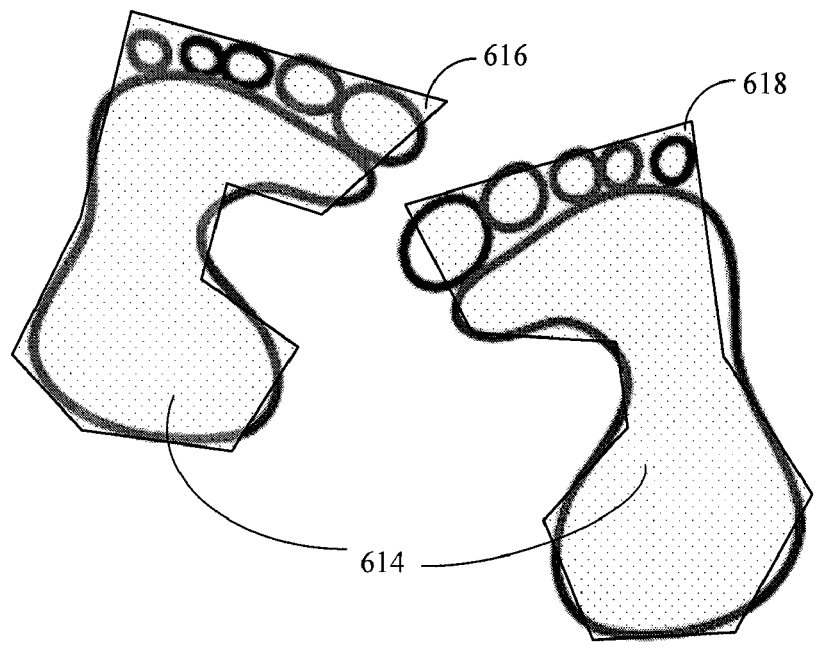
FIG. 6f is a view of a graphical object with a plurality of non-connected visible regions, and a polygonal approximation to the same by a plurality of polygons.

FIG. 6f shows a graphical object 614 that represents a pair of footprints and whose non-transparent regions form more than two disjoint (non-connected) regions. Also illustrated in FIG. 6f is a pair of polygons, polygon 616 and polygon 618 that may be constructed by an embodiment of the present invention as the selection regions for graphical object 614. Those skilled in the art will understand that the partitioning of graphical object regions into an approximation by a plurality of polygons can be accomplished by algorithms well known in the art.

It will be understood by those skilled in the art that the various polygons shown in FIG. 6a-6f can be used in constructing selection overlays for the respective graphical objects. It will also be understood by those skilled in the art that "polygon" is used in this description to define a closed region (including the interior, and not just the perimeter that consists of the edges of the polygon), in the style of common usage in mathematics and computer science.

Figure 7:
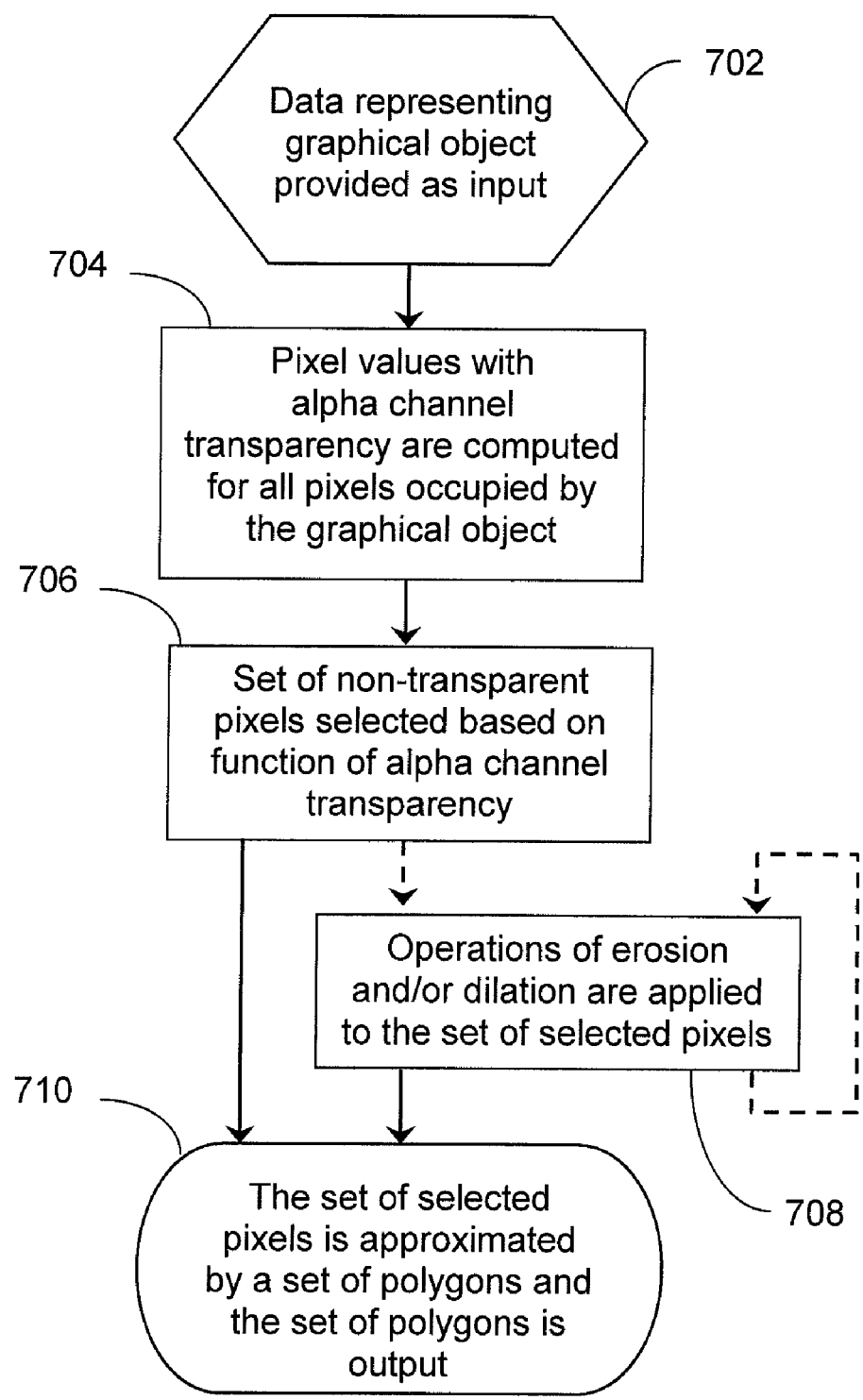
FIG. 7 is a flowchart of an example process for determining polygons from a graphical object for use in a selection overlay.

FIG. 7 illustrates the steps of a process used in various embodiment of the invention to compute polygons from a graphical object for use in a selection overlay. First, in step 702, data representing a graphical object is input. For example, a set of vector graphics components may be input as instructions for the on-screen drawing of the graphical object or a set of pixel values (e.g. as a raster image) may be input. In step 704 pixel values for all screen locations occupied by the graphical object are computed, for example by interpreting the vector graphics components or by resampling or resizing the raster image pixel values, as will be understood by those skilled in the art. In particular, alpha-channel transparency values are computed as part of the pixel values. In step 706, a set of non-transparent pixels is selected using the pixel values computed in step 704, for example using a thresholding function on the respective alpha-channel transparency values, as will be understood by those skilled in the art. Following step 706, zero or more operations of erosion and dilation may be applied to the selected set of pixels (thereby producing a new, updated set of pixels at each step), through iterative performance of step 708. Alternatively, step 708 may be skipped entirely in various embodiments. In step 710, the set of pixels selected in previous steps, which roughly describe the screen locations occupied by the graphical object, is further approximated by one or more polygons, and the polygons are output.

Figure 8:
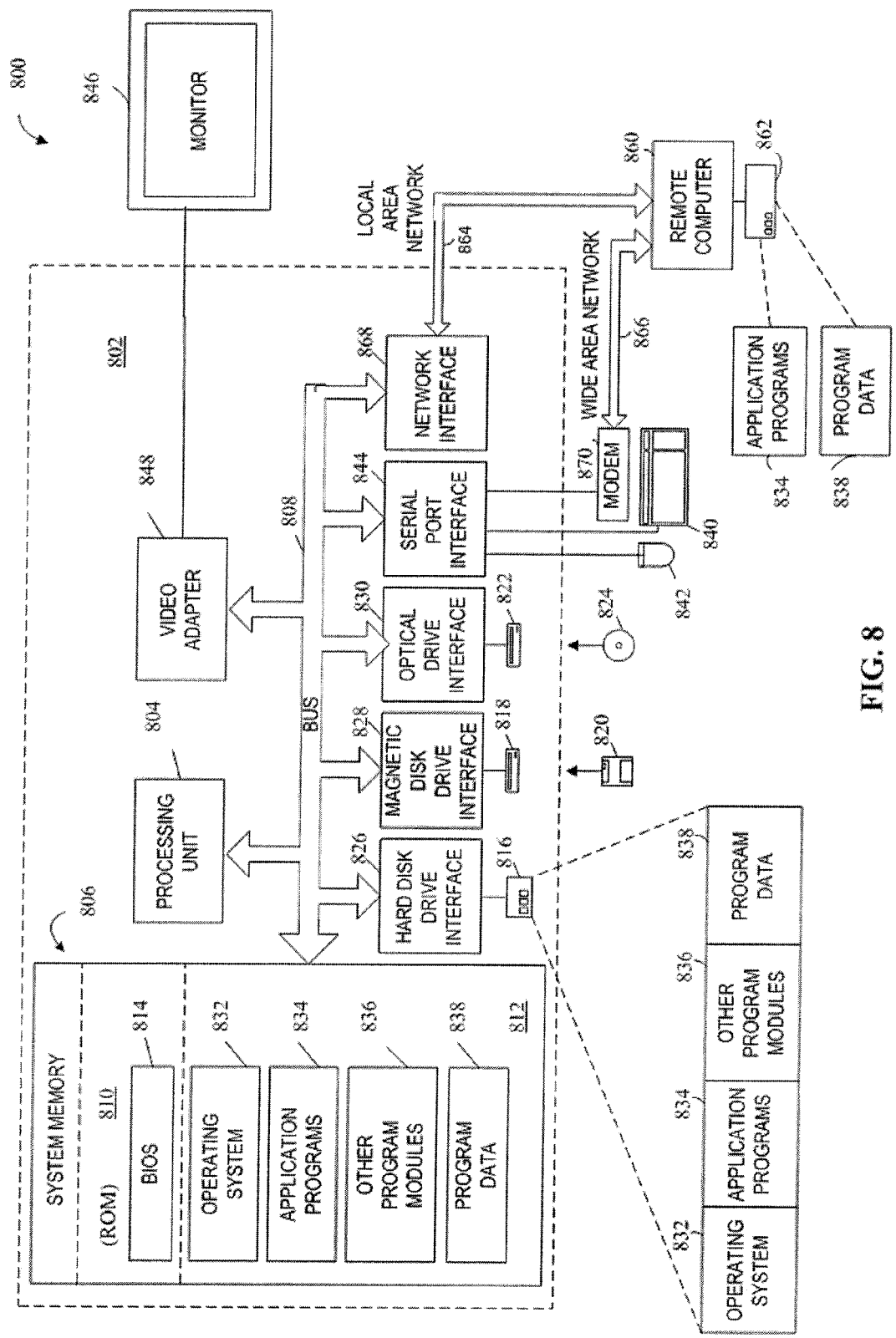
FIG. 8 is a block diagram of a general purpose computer system for an environment in which various embodiments of the invention can function.

With reference to FIG. 8, an exemplary system environment 800 for implementing the various aspects of the invention includes a conventional computer 802, including a processing unit 804, a system memory 806, and a system bus 808 that couples various system components, including the system memory, to the processing unit 804. The processing unit 804 may be any commercially available or proprietary processor. In addition, the processing unit may be implemented as multi-processor formed of more than one processor, such as may be connected in parallel.

The system bus 808 may be any of several types of bus structure including a memory bus or memory controller, a peripheral bus, and a local bus using any of a variety of conventional bus architectures such as PCI, VESA, Microchannel, ISA, and EISA, to name a few. The system memory 806 includes read only memory (ROM) 810 and random access memory (RAM) 812. A basic input/output system (BIOS) 814, containing the basic routines that help to transfer information between elements within the computer 802, such as during start-up, is stored in ROM 810.

The computer 802 also may include, for example, a hard disk drive 816, a magnetic disk drive 818, e.g., to read from or write to a removable disk 820, and an optical disk drive 822, e.g., for reading from or writing to a CD-ROM disk 824 or other optical media. The hard disk drive 816, magnetic disk drive 818, and optical disk drive 822 are connected to the system bus 808 by a hard disk drive interface 826, a magnetic disk drive interface 828, and an optical drive interface 830, respectively. The drives 816-822 and their associated computer-readable media provide nonvolatile storage of data, data structures, computer-executable instructions, etc. for the computer 802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 800, and further that any such media may contain computer-executable instructions for performing the methods of the present invention.

A number of program modules may be stored in the drives 816-822 and RAM 812, including an operating system 832, one or more application programs 834, other program modules 836, and program data 838. The operating system 832 may be any suitable operating system or combination of operating systems. By way of example, the application programs 834 and program modules 836 can include an information searching scheme in accordance with an aspect of the present invention.

A user can enter commands and information into the computer 802 through one or more user input devices, such as a keyboard 840 and a pointing device (e.g., a mouse 842). Other input devices (not shown) may include a microphone, a joystick, a game pad, a satellite dish, a wireless remote, a scanner, or the like. These and other input devices are often connected to the processing unit 804 through a serial port interface 844 that is coupled to the system bus 808, but may be connected by other interfaces, such as a parallel port, a game port or a universal serial bus (USB). A monitor 846 or other type of display device is also connected to the system bus 808 via an interface, such as a video adapter 848. In addition to the monitor 846, the computer 802 may include other peripheral output devices (not shown), such as speakers, printers, etc.

It is to be appreciated that the computer 802 can operate in a networked environment using logical connections to one or more remote computers 860. The remote computer 860 may be a workstation, a server computer, a router, a peer device or other common network node, and typically includes many or all of the elements described relative to the computer 802, although for purposes of brevity, only a memory storage device 862 is illustrated in FIG. 8. The logical connections depicted in FIG. 8 can include a local area network (LAN) 864 and a wide area network (WAN) 866. Such networking environments are commonplace in offices, enterprise-wide computer networks, intranets and the Internet.

When used in a LAN networking environment, for example, the computer 802 is connected to the local network 864 through a network interface or adapter 868. When used in a WAN networking environment, the computer 802 typically includes a modem (e.g., telephone, DSL, cable, etc.) 870, or is connected to a communications server on the LAN, or has other means for establishing communications over the WAN 866, such as the Internet. The modem 870, which can be internal or external relative to the computer 802, is connected to the system bus 808 via the serial port interface 844. In a networked environment, program modules (including application programs 834) and/or program data 838 can be stored in the remote memory storage device 862. It will be appreciated that the network connections shown are exemplary and other means (e.g., wired or wireless) of establishing a communications link between the computers 802 and 860 can be used when carrying out an aspect of the present invention.

In accordance with the practices of persons skilled in the art of computer programming, the present invention has been described with reference to acts and symbolic representations of operations that are performed by a computer, such as the computer 802 or remote computer 860, unless otherwise indicated. Such acts and operations are sometimes referred to as being computer-executed. It will be appreciated that the acts and symbolically represented operations include the manipulation by the processing unit 804 of electrical signals representing data bits which causes a resulting transformation or reduction of the electrical signal representation, and the maintenance of data bits at memory locations in the memory system (including the system memory 806, hard drive 816, floppy disks 820, CD-ROM 824, and remote memory 862) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A processor based method for graphical object selection, the method comprising:
   generating a respective selection overlay for each of a plurality of graphical objects, wherein each graphical object is assigned to a respective layer and each selection overlay defines a selectable region for an associated graphical object;
   sorting the selection overlays into respective layers over the layers of the graphical objects, wherein the sorting is based on characteristics of the graphical objects other than the layers to which the graphical objects are assigned;
   displaying the plurality of graphical objects and selection overlays;
   in response detecting entry of a user-directed pointer into overlapping portions of at least two of the selection regions associated with at least two graphical objects in different layers, selecting for user manipulation one of the at least two graphical objects associated with one of the at least two selection regions based on the layers to which the two or more selection regions are assigned; and
   displaying the graphical object associated with the one selection overlay in an updated state in response to user manipulation of the graphical object;
   wherein the method further comprising determining each selection overlay based on transparency levels of image data of the associated graphical object, and wherein the determining further comprises applying image erosion and image dilation to the image data of the associated graphical object.

2. The method of claim 1, wherein the generating of the selection overlay for each graphical object comprises:
   reading the image data for each graphical object into memory;
   computing from the image data, a selection overlay as a geometric approximation of an area occupied by the graphical object.

3. The method of claim 2, wherein the geometric approximation for each graphical object includes a plurality of polygons.

4. The method of claim 1, wherein the characteristics of the graphical objects used in the sorting of the selection overlays includes an area of a respective rectangular bounding box that contains each graphical object.

5. The method of claim 1, wherein the characteristics of the graphical objects used in the sorting of the selection overlays includes a respective elapsed time since each graphical object was last selected.

6. The method of claim 1, wherein each selection overlay includes a plurality of shapes selected from the group consisting of circles and polygons.

7. The method of claim 1, wherein at least one of the graphical objects has at least two associated selection regions that are not connected.

8. The method of claim 1, wherein at least one of the graphical objects occupies a non-simply connected region and the associated selection region is a simply connected polygon.

9. A processor based method for graphical object selection, the method comprising:
   generating a respective selection overlay for each of a plurality of graphical objects, wherein each graphical object is assigned to a respective layer and each selection overlay defines a selectable region for an associated graphical object;
   sorting the selection overlays into respective layers over the layers of the graphical objects, wherein the sorting is based on characteristics of the graphical objects other than the layers to which the graphical objects are assigned;
   displaying the plurality of graphical objects and selection overlays;
   in response detecting entry of a user-directed pointer into overlapping portions of at least two of the selection regions associated with at least two graphical objects in different layers, selecting for user manipulation one of the at least two graphical objects associated with one of the at least two selection regions based on the layers to which the two or more selection regions are assigned; and
   displaying the graphical object associated with the one selection overlay in an updated state in response to user manipulation of the graphical object;
   wherein the characteristics of the graphical objects used in the sorting of the selection overlays includes a respective number of pixels each graphical object would occupy when displayed without subtracting pixels occluded by another graphical object in a higher layer and a respective number of pixels each graphical object would occupy when displayed with subtracting pixels occluded by another graphical object in a higher layer.

10. A processor based method for graphical object selection, the method comprising:
    generating a respective selection overlay for each of a plurality of graphical objects, wherein each graphical object is assigned to a respective layer and each selection overlay defines a selectable region for an associated graphical object;
    sorting the selection overlays into respective layers over the layers of the graphical objects, wherein the sorting is based on characteristics of the graphical objects other than the layers to which the graphical objects are assigned;

displaying the plurality of graphical objects and selection overlays;

in response detecting entry of a user-directed pointer into overlapping portions of at least two of the selection regions associated with at least two graphical objects in different layers, selecting for user manipulation one of the at least two graphical objects associated with one of the at least two selection regions based on the layers to which the two or more selection regions are assigned; and displaying the graphical object associated with the one selection overlay in an updated state in response to user manipulation of the graphical object;

wherein the characteristics of the graphical objects used in the sorting of the selection overlays includes one or more characteristic from the group consisting of a respective number of pixels each graphical object would occupy when displayed without subtracting pixels occluded by another graphical object in a higher layer, a respective number of pixels each graphical object would occupy when displayed with subtracting pixels occluded by another graphical object in a higher layer, an area of a respective rectangular bounding box that contains each graphical object, a respective priority value for each graphical object, and a respective elapsed time since each graphical object was last selected.

11. A processor based method for graphical object selection, the method comprising:

displaying a plurality of graphical objects;

in response to detecting a pointer event, determining a first subset of the first plurality of graphical objects, wherein determination of the graphical objects in the first subset is a function of a portion of a respective screen position occupied by each graphical object overlapping a screen position of the pointer event;

computing a respective selection value for each graphical object in the first subset as a function of one or more properties of the graphical object other than a stacking layer of the graphical object;

determining from the first subset of graphical objects a selected graphical object having a most desirable selection value; and outputting the selected graphical object wherein the properties of the graphical objects used in the computing a respective selection value includes a respective number of pixels each graphical object would occupy when displayed without subtracting pixels occluded by another graphical object in a higher layer and a respective number of pixels each graphical object would occupy when displayed with subtracting pixels occluded by another graphical object in a higher layer.

12. The method of claim 11, wherein the characteristics of the graphical objects used in the computing a respective selection value includes an area of a respective rectangular bounding box that contains each graphical object.

13. The method of claim 11, wherein the characteristics of the graphical objects used in the computing a respective selection value includes a respective elapsed time since each graphical object was last selected.

14. A processor based method for graphical object selection, the method comprising:

displaying a plurality of graphical objects;

in response to detecting a pointer event, determining a first subset of the first plurality of graphical objects, wherein determination of the graphical objects in the first subset is a function of a portion of a respective screen position occupied by each graphical object overlapping a screen position of the pointer event;

computing a respective selection value for each graphical object in the first subset as a function of one or more properties of the graphical object other than a stacking layer of the graphical object;

determining from the first subset of graphical objects a selected graphical object having a most desirable selection value; and outputting the selected graphical object;

wherein the characteristics of the graphical objects used in the sorting of the selection overlays includes one or more characteristic from the group consisting of a respective number of pixels each graphical object would occupy when displayed without subtracting pixels occluded by another graphical object in a higher layer, a respective number of pixels each graphical object would occupy when displayed with subtracting pixels occluded by another graphical object in a higher layer, an area of a respective rectangular bounding box that contains each graphical object, a respective priority value for each graphical object, and a respective elapsed time since each graphical object was last selected.

15. An apparatus for graphical object selection, the apparatus comprising:

means for displaying a plurality of graphical objects;

means, responsive to detecting a pointer event, for determining a first subset of the first plurality of graphical objects, wherein determination of the graphical objects in the first subset is a function of a portion of a respective screen position occupied by each graphical object overlapping a screen position of the pointer event;

means for computing a respective selection value for each graphical object in the first subset as a function of one or more properties of the graphical object other than a stacking layer of the graphical object;

means for determining from the first subset of graphical objects a selected graphical object having a most desirable selection value; and means for outputting the selected graphical object;

wherein the properties of the graphical objects used in the computing a respective selection value includes a respective number of pixels each graphical object would occupy when displayed without subtracting pixels occluded by another graphical object in a higher layer and a respective number of pixels each graphical object would occupy when displayed with subtracting pixels occluded by another graphical object in a higher layer.

16. An apparatus for graphical object selection, the apparatus comprising: a display; and a processor configured to:

generate a respective selection overlay for each of a plurality of graphical objects, wherein each graphical object is assigned to a respective layer and each selection overlay defines a selectable region for an associated graphical object;

sort the selection overlays into respective layers over the layers of the graphical objects, wherein the sorting is based on characteristics of the graphical objects other than the layers to which the graphical objects are assigned;

display the plurality of graphical objects and selection overlays on the display;

in response detecting entry of a user-directed pointer into overlapping portions of at least two of the selection regions associated with at least two graphical objects in different layers, select for user manipulation one of the at least two graphical objects associated with one of the at least two selection regions based on the layers to which the two or more selection regions are assigned; and display the graphical object associated with the one selection overlay in an updated state on the display in response to user manipulation of the graphical object;

wherein the processor is further configured to determine each selection overlay based on transparency levels of image data of the associated graphical object, and wherein the determining further comprises applying image erosion and image dilation to the image data of the associated graphical object.

\* \* \* \* \*